C. O. WOOD.
SHAFT HANGER.
APPLICATION FILED JAN. 24, 1914.
1,130,233.
Patented Mar. 2, 1915.
3 SHEETS—SHEET 1.
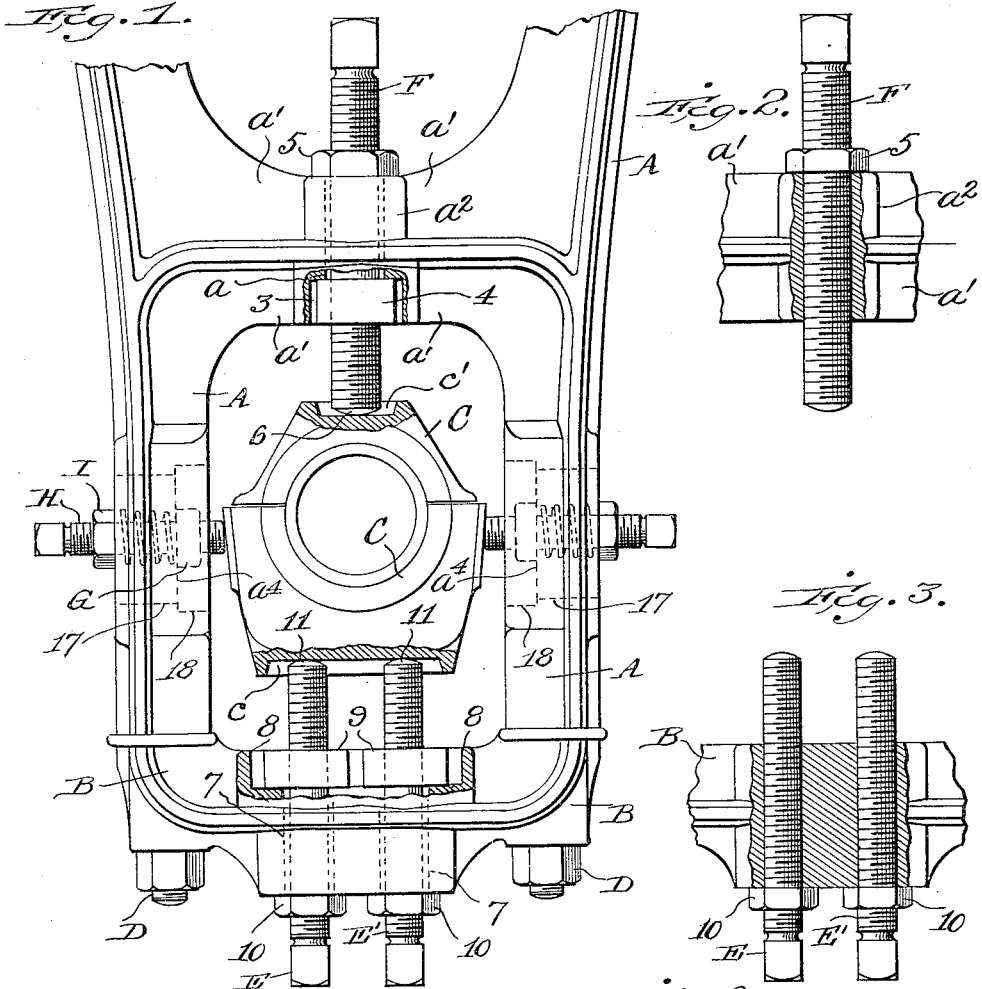
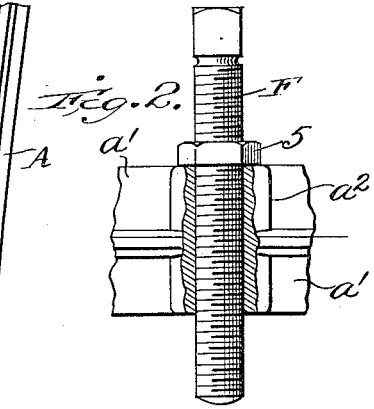
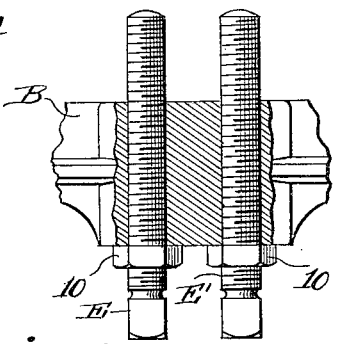
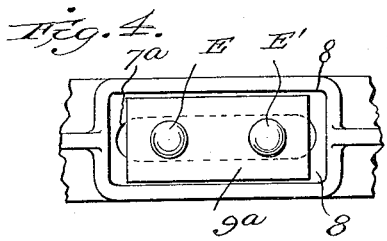
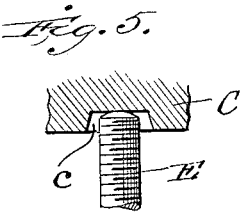
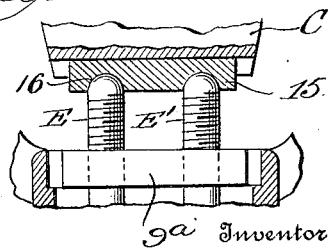
Witnesses
B. Dommers
E. Leckert
Inventor
Charles O. Wood
By Henry Orth
Attorney

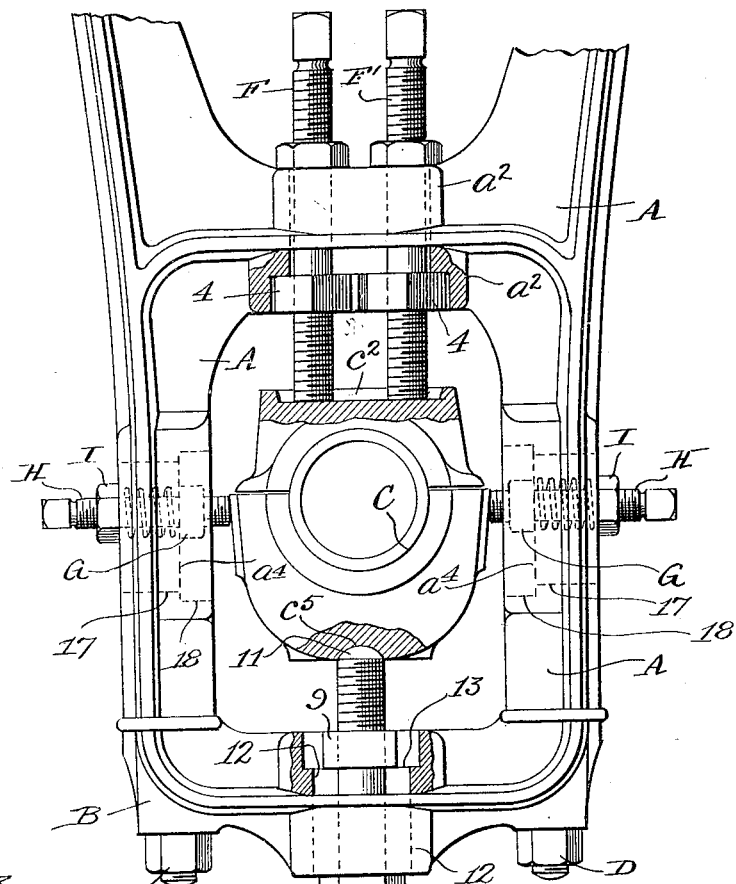
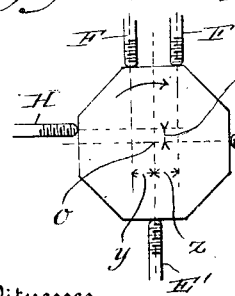
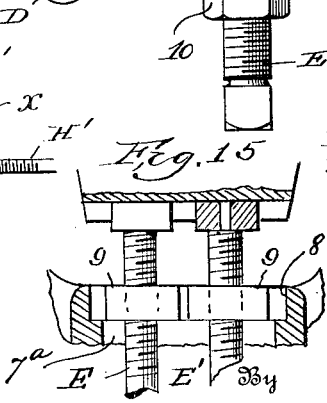

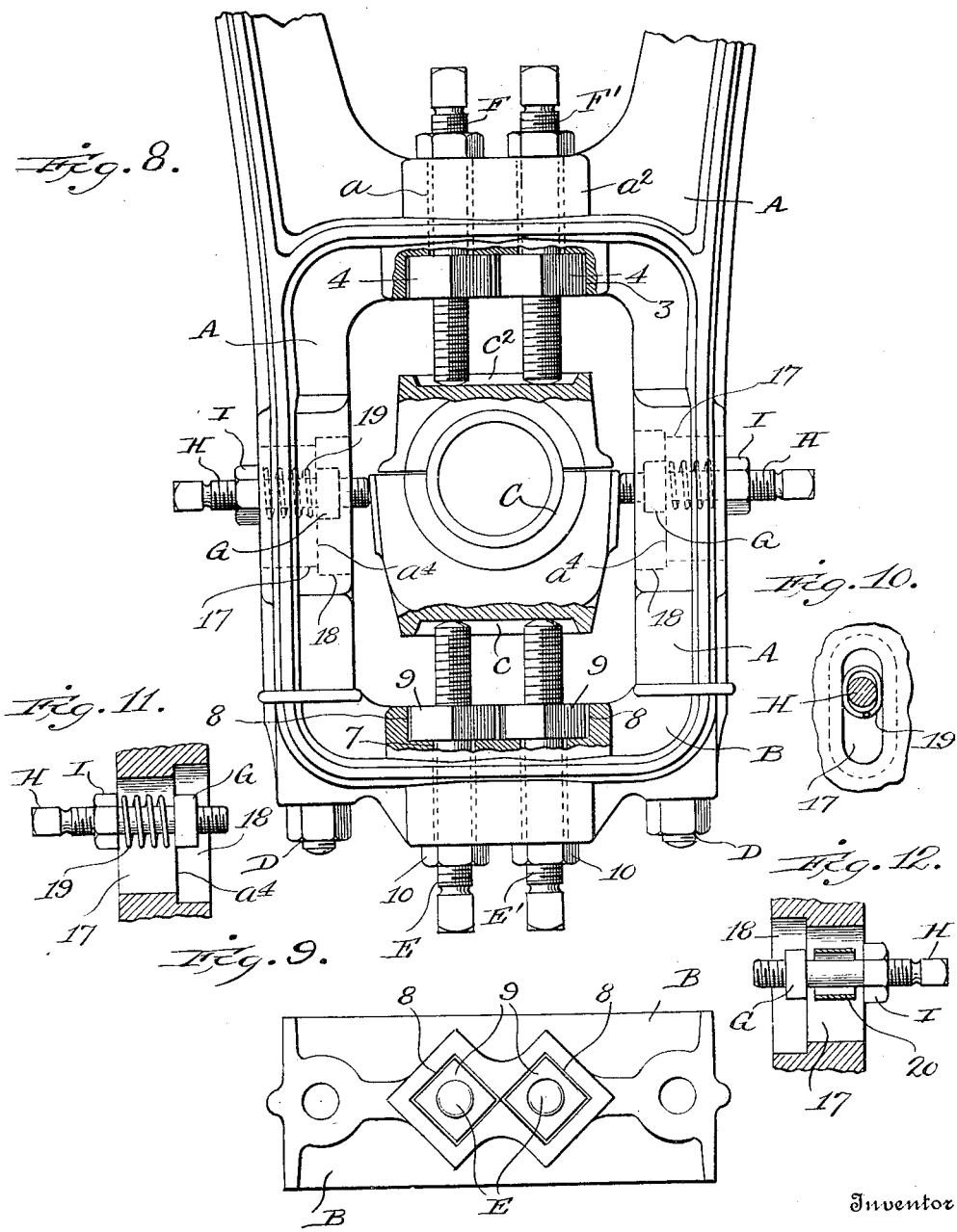

UNITED STATES PATENT OFFICE.

CHARLES O. WOOD, OF CHAMBERSBURG, PENNSYLVANIA, ASSIGNOR TO T. B. WOOD'S SONS COMPANY, OF CHAMBERSBURG, PENNSYLVANIA, A CORPORATION OF PENNSYLVANIA.

SHAFT-HANGER.

1,130,233.  Specification of Letters Patent.  Patented Mar. 2, 1915.

Application filed January 24, 1914. Serial No. 814,093.

*To all whom it may concern:*

Be it known that I, CHARLES O. WOOD, a citizen of the United States, residing at Chambersburg, in the county of Franklin and State of Pennsylvania, United States of America, have invented certain new and useful Improvements in Shaft-Hangers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to shaft hangers of that type in which the bearing or bearing box is supported in the hanger frame directly on screws.

The structures heretofore found most favorable and now generally used have a single supporting screw of either large or small diameter, engaging the top and bottom of the box, *i. e.*, a single load-supporting screw engaging the bottom of the shaft bearing, or bearing box, a single holding down screw engaging the top, and side screws engaging the sides of the box. The box is transversely shiftable to one side or the other of the center on the supporting screws by means of the side screws.

It frequently becomes necessary to adjust the bearing box laterally within the hanger frame, and after this has been done the load is usually not applied symmetrically to said supporting screws, unless said screws shift with the box, that is to say, is not applied through the vertical axis of the screws, thus imparting a bending moment to both the load supporting screw and the holding down screw. The side screws occasionally become loose, especially when there is vibration of the hanger frame, due to either too long a section of shaft between hangers, or to the fact that the ceiling beams to which the hangers are attached are not sufficiently rigid, or have warped. When this happens the bearing or bearing box tilts, and either bends or breaks the load supporting screw, when of small diameter, or one or all of the other screws. The bending of the screws has been obviated by using screws of much larger diameter, which are more expensive, and many times the strength required for their customary work of sustaining the loads, and necessarily designed to meet extraordinary conditions. And, notwithstanding the use of vertical screws of large diameter both for the top and for the bottom of the bearing box, when the box is shifted to adjust it to the alinement of the shaft the load is eccentric to the screw, and the tipping of the box, when the side screws become loosened, has not been avoided.

The problem of overcoming the tipping of the bearing, or bearing box, while maintaining all the other desirable features of the hanger, such as vertical and lateral adjustment and vertical tipping or rocking, has engaged the attention of engineers for some time.

After practical trials of many different arrangements, I believe the invention hereinafter described to be a practical and simple solution of the problem of maintaining the box or bearing stable in the hanger frame and still maintaining the flexibility and range of adjustment heretofore used.

The results which I attain have long been sought, and I have succeeded in overcoming the difficulties so long contended with, and practical use has proven my hanger to be a decided advance over the existing art.

The following additional advantages are secured over single supporting screws and single holding screws; the forces are distributed to a greater number of points, which decreases the load on any one point of the bearing box; if the frame is not plumb so that the bearing or box is not plumb when in its ordinary position, one load supporting screw may be raised higher than the other to plumb the bearing or bearing box; the surfaces $c$ and $c'$ on the box need not be machined, as any unevenness may be compensated by adjusting one or the other screw.

Referring to the drawings, in which like parts are similarly designated—Figure 1 is an elevation of so much of a hanger as will be sufficient to illustrate my invention, with parts thereof shown in section. Fig. 2 is a sectional detail view of a modified arrangement of holding down screws. Fig. 3 is a like view of a similar arrangement of supporting screws. Fig. 4 is a plan showing two screws in a single nut adjustable within its recess. Fig. 5 is a transverse section of a portion of the bottom of the bearing box showing the width of the recess in relation to a supporting screw. Fig. 6 is an elevation, partly in section, showing a block interposed between the box and screw ends. Fig. 7 is a modification of Fig. 1, showing two holding-down screws and one supporting screw, the supporting screw being capable of lateral adjustment. Fig. 8 is a further modification, showing two holding-down screws and two supporting screws. Fig. 9 is a plan view of a hanger head showing the nut seats and the supporting screws. Fig. 10 is an elevation, and Fig. 11 a section of means for frictionally holding the side screws. Fig. 12 is a modification of the means shown in Fig. 11. Fig. 13 is a force diagram showing the distribution of forces between five screws, and Fig. 14 is a like diagram for six screws. Fig. 15 is a modification of Fig. 6.

Referring now to Fig. 1, A is the frame and B is the removable hanger head held to the frame by bolts and nuts at D. The side screws H are vertically adjustable in slots in the side arms of the frame, as is customary, and held in place by the nuts G and I. C represents the bearing or bearing box having in its top a recess $c'$ and in its bottom a recess $c$. The transverse brace $a'$ is provided with a boss $a^2$ in which a holding down screw F is mounted. These several features are similar to those shown in my Patent No. 790,609, dated May 23, 1905. I provide the boss $a^2$ with a bore $a$ of larger diameter than the screw F, and at its bottom there is a larger recess 3 in which the square nut 4 and the screw F are laterally shiftable. The recess 3, while forming a seat for the nut in which it is laterally shiftable, prevents the nut 4 from turning as the screw is rotated for raising or lowering. The screw F is held tight by the jam-nut 5. This structure obviates the necessity of threading the hole $a$, and thus decreases the cost of manufacture. There is, however, no objection to threading the hole if desired, as shown in Fig. 2, but the structure shown in this figure does not permit the screw F to be laterally shifted, as in Fig. 1. The lower end of screw F is preferably, but not necessarily, rounded, as at 6, where it bears against the bottom of recess $c'$, which also may or may not be rounded.

The side walls of the recess prevent the box C from being moved too far with respect to the screw, during adjustment, and assists in temporarily loosely holding the box in place during erection.

The head B of the hanger is provided with a plurality of screws E and E', it being immaterial how these screws are mounted in the head. In Fig. 1 the bores 7 both terminate in a nut receiving socket 8, similar to recess 3, for the square nuts 9 of a plurality of load supporting screws, E, E'. Or there may be a single slot $7^a$ through which both of the load supporting screws pass, as in Fig. 4, and both screws, E and E' may be tapped into a single nut $9^a$ to facilitate the lateral adjustment of the screws and nut in recess 8. Jam nuts 10 hold the screws E and E' rigid. These screws E and E' may, like screw F, Fig. 2, have threaded engagement with their bores, in which case the recesses 8 and nuts 9 are dispensed with, as shown in Fig. 3. The ends of screws E have preferably, but not necessarily, rounded ends 11, that enter the recess $c$ formed on the under side of the box or bearing C and which extends transversely of the box, the width thereof being sufficiently greater than the diameter of the screws E and E' to permit freedom of movement of the box on the ends of the screws E and E' and also sufficient to satisfy manufacturing conditions. This recess $c$ is illustrated in cross section in Fig. 5.

Between the load supporting screws and the bearing or box I also interpose a block 15, Fig. 6, having recesses 16 for the ends of the load supporting screw E and E' thereby preventing the block from sliding with respect to these screws while the box C is laterally adjusted along the block. This block acts as a simple beam supported on the ends of the screws, and its top surface is preferably rounded so as to permit the box to rock fore and aft thereon.

In lieu of the block 15, Fig. 6, the screws E, E' may have T-shaped ends either rigidly or pivotally connected to the screws. The box C is directly supported on these T-shaped ends, Fig. 15.

In Fig. 7 I have shown a single load supporting screw E' having its rounded end fitting into a cup-shaped socket $c^5$ to form a sort of ball and socket joint. This screw is laterally adjustable in the head B which is provided for this purpose with a slot 12 terminating at its end in a recessed nut seat 13 on which the nut 9 may slide sidewise and carry the screw E' with it. As the box C is adjusted by the side screws the screw E' may be correspondingly adjusted and then locked tight by the jam nut 10. In this form of my invention I use a plurality of holding-down screws F, F', two being shown, whose ends are preferably, but not necessarily flat, and enter a transverse recess $c^2$ in the top of the bearing or box C. These screws, being spaced apart, prevent the box from tipping on the end of screw E', and the line of load should, for proper operation, lie between the axes of the two holding screws F and F', and consequently the effective length of the slot 12 for the lower screw E' need not be greater than the distance between the axes of the upper screws.

In Figs. 8 and 9 I have shown the use of a plurality of holding-down screws F and a plurality of load-supporting screws E. The arrangement of the load-supporting screws is similar to that shown in Fig. 1, while the arrangement of the holding-down screws is similar to that shown in Fig. 7. This arrangement of a plurality of holding-down screws, as F, F', and a plurality of load-supporting screws, as E, E', will give a maximum of stability for the box or bearing C. Although I have shown only two screws at the top and bottom and only one on each side of the box C, it is evident that the number may be increased at will, as the exigencies of any particular installation may demand or permit.

The distance between the axes of the load-supporting screws should be a multiple of the maximum lateral adjustment, to give a maximum of stability. Thus it will be seen that the force distribution is considerably greater than when only two vertical screws are used, one above and one below the box, where the load is concentrated in lines through these two screws.

The advantages as shown by actual use, aside from materially decreasing the cost of construction, are numerous; the boxes never tip and spill their oil, which in cloth factories and cotton mills is a decided advantage, saving hundreds of dollars in goods damaged by oil stains; the oil rings from the shaft box to the shaft work more evenly and with less friction, and no breakages whatever have occurred up to the present time.

The sides of the hanger frame are provided with slots 17, terminating in wider slots 18 on the inner sides of the hanger arms, forming seats or shoulders $a^4$. These slots 17 and 18 are opposite the bearing or bearing box C, and the side screws H are vertically adjustable in them. Surrounding the side screws H between the nuts G and lock-nuts I, I place a holding device for said screws in the form of a coil spring 19, Figs. 10 and 11, or in the form of a piece of coiled sheet metal or elastic tubing 20, Fig. 12. The diameter of the device, 19 or 20, is slightly greater than the width of slot 17, so that when in place on the side screw it will be slightly elongated, as shown in Fig. 10, and support the screw in any position along the vertical slot, by reason of the frictional engagement of the device with the sides of the slot 17, so that when the nuts G and I are loose the side screw H will remain in any position along the slot. This is of great advantage in erecting shafting, as it leaves the workman free to use both hands when setting the side screws.

Figs. 13 and 14 are two force diagrams for five and six point support. It is seldom that the side screws are placed exactly on line, and more rarely that they are placed in line exactly through the center of the bearing. When the side screw H, Fig. 13, is tightened up at a distance above H' there is produced a force couple whose moment is $x$ times the force applied by H tending to rotate the box in the direction of the arrow Fig. 13, which force couple is resisted by a couple $y$ times the force at the holding-down screw F. The moments of these couples are partly dependent upon their lever arms, i. e., the distance between the line of application of the oppositely directed forces of the couple, the distances $x$ and $y$, which naturally vary. If H' be above H the couple H—H' tends to rotate the bearing in an opposite, counter clock-wise direction, and is opposed by the couple F'—E' whose lever arm is $z$.

In Fig. 14, the couple H—H'—$x^2$ tends to rotate the box and is resisted by the couple F—E'—$y'$. When the screw H' is above the screw H, the couple tends to rotate the box in an opposite direction counter clockwise, and is then opposed by the couple F'—E—$y'$.

The arrangement with a plurality of holding-down screws and a plurality of load-supporting screws is the most stable of the several forms illustrating my invention.

When the hangers are fastened to roof rafters, which usually have a pitch of one inch to the foot, more or less, the hanger need not be mounted on leveling blocks. The inclination of the hanger is immaterial, as by using my invention the box bearing C can be tilted with respect to the hanger frame by one or the other of screws E—E' or F—F', so that notwithstanding the unsymmetrical position of the box with respect to the hanger frame, the box can always be maintained plumb.

I am aware that I am not the first to employ two supporting screws in a hanger, but such known mechanisms have been too expensive to construct, and for this reason have not come into general use. I believe, however, that I am the first to use a plurality of load supporting screws with a single holding-down screw, or a plurality of holding-down screws that directly or indirectly engage the box or bearing while permitting said bearing to be laterally and vertically adjusted for alinement of the shaft, and at the same time permit the bearing or box to rock on them, while also providing means for tilting the box sidewise and still maintaining proper support.

I claim—

1. A shaft hanger comprising a frame, a shaft bearing in the frame, rigid means in the hanger frame for engaging and holding the top of the bearing and rigid means in the frame for engaging and holding the bottom of the bearing, one of said means including devices to rotate or tilt the bearing and hold it unsymmetrically with respect to the frame, said means arranged to permit the bearing to rock fore and aft thereon, and side screws for laterally adjusting the bearing with respect to both of said means.

2. A shaft hanger comprising a frame, a shaft bearing, holding means mounted in the frame and engaging the bearing on its top, and supporting means mounted in the frame and engaging its bottom, side screws for engaging and laterally adjusting the bearing in the frame on said means while permitting the rocking of the bearing, one of said means comprising a plurality of screws adjustable to different extents to rotate or tilt the bearing, the axis of said screws adjacent the hanger sides being normally spaced from the line of the center of the load, and said means and screws arranged to permit the bearing to rock fore and aft.

3. A shaft hanger comprising a frame, a shaft bearing, holding means mounted in the frame and engaging the bearing on its top, and supporting means mounted in the frame and engaging its bottom, side screws for laterally adjusting the bearing in the frame on said means, one of said means comprising a plurality of screws adjustable to different extents to rotate or tilt the bearing and arranged substantially in a plane at right angles to the longitudinal axis of the bearing, the axis of the outermost screw of said plurality of screws being normally spaced from the line of the center of the load, said means and screws arranged to permit the bearing to rock fore and aft.

4. A shaft hanger comprising a frame, a shaft bearing, rigid holding means mounted in the frame engaging the top of the bearing and rigid supporting means mounted in the frame engaging the bottom of the bearing, side screws for engaging the sides of the bearing to laterally adjust it on said means, both of said means comprising a plurality of screws adjustable to different extents to rotate or tilt said bearing, the axes of the screws of each of said means adjacent the hanger sides being spaced apart to cause the center of the load to be maintained between them under all conditions of adjustment.

5. A shaft hanger comprising a frame, a shaft bearing, rigid holding means mounted in the frame engaging the top of the bearing and rigid supporting means mounted in the frame engaging the bottom of the bearing to rotate or tilt the bearing, side screws for engaging the sides of the bearing to laterally adjust it on said means, both of said means comprising a plurality of screws arranged in substantially one plane at right angles to the axis of the bearing while permitting the bearing to rock fore and aft, the axes of the outermost screws of each of said means being spaced apart to cause the center of the load to be maintained between them under all conditions of adjustment.

6. A shaft hanger comprising a frame, a bearing box, means mounted on the frame between which the box is supported at its top and bottom and arranged to permit the bearing to rock fore and aft, side screws for adjusting the box laterally on said means, one of said means comprising two screws adjustable to different extents to rotate or tilt said box, whose axes are arranged in a plane substantially perpendicular to the axis of the bearing and whose distances apart are at least equal to the sum of the two maximum lateral distances of adjustment of said box.

7. A shaft hanger comprising a frame, a bearing box, two holding down screws in the frame for holding the box down, two load supporting screws in the frame for supporting the box, said screws arranged to permit the box to rock and being adjustable to rotate or tilt the box, the axes of said screws arranged in planes substantially at right angles to the axis of the box, and side screws for laterally adjusting the box with respect to the holding down and supporting screws.

8. A shaft hanger comprising a frame, a bearing box, a removable hanger head having nut-receiving recesses therein with bores extending from said recesses through the head, a nut in each recess, a load-supporting screw in each nut, said screws adjustable to different extents to rotate or tilt the box, side screws for adjusting the box laterally on the load supporting screws and a jam nut for each load supporting screw.

9. A shaft hanger comprising a frame, a bearing box, a removable hanger head having nut-receiving recesses therein with bores extending from said recesses through the head, a nut in each recess, a load supporting screw in each nut, said screws adjustable to rotate or tilt the box, side screws for adjusting the box laterally on the load supporting screws, and a jam-nut for each load-supporting screw, the distance apart of the axes of the load supporting screws being a multiple of the lateral adjustment of the box.

10. In a shaft hanger, a frame having slots in its sides, side screws in said slots, resilient means between the screws and slots to frictionally hold the screws in any position in their slots.

11. In a shaft hanger, a frame having a slot in each side, side screws in the slots a nut on each screw at each side of the frame side, and a spring surrounding each screw and engaging the sides of said slots to frictionally hold the screws in any adjusted position when the nuts on said screws are in inoperative positions.

12. A shaft hanger comprising a frame, a bearing box, load supporting screws for rotating the box, intermediate rigid means between the ends of the load supporting screws and box on which said box is slidable, and side screws to laterally slide the box on said means for lateral adjustment, said box arranged to rock fore and aft on said means.

13. A shaft hanger comprising a frame, a bearing box, two load supporting screws adjustable to different extents for rotatably adjusting the box, intermediate elements between the screws and box comprising blocks on the ends of said screws and forming alined slide ways for said box, side screws to laterally slide the box on said means for lateral adjustment, said box arranged to rock fore and aft on said means.

14. A shaft hanger comprising a frame, a shaft bearing box, means in the frame for engaging and holding the top of the box, and means for engaging and holding the bottom of the box, said means arranged to hold and guide the box entirely free of the frame and permit it to rock, and one of said means constituting devices to rotatably adjust the box with respect to the frame, and side screws for laterally adjusting the box with respect to said means.

In testimony that I claim the foregoing as my invention, I have signed my name in presence of two subscribing witnesses.

CHARLES O. WOOD.

Witnesses:
W. H. FISHER,
CLAY L. HENNINGER.

Copies of this patent may be obtained for five cents each, by addressing the "Commissioner of Patents, Washington, D. C."